(12) United States Patent
Carstensen et al.

(10) Patent No.: US 9,482,078 B2
(45) Date of Patent: Nov. 1, 2016

(54) DIFFUSER FOR CABLE SUSPENDED DEWATERING PUMPING SYSTEM

(71) Applicant: Zeitecs B.V., Rijswijk (NL)

(72) Inventors: Christian Carstensen, Aachen (DE); Rik De Doncker, Leuven (BE); Helge Brauer, Cologne (DE); Holger Franz, Aachen (DE); Johannes Schmidt, Aachen (DE); Benjamin Eduard Wilkosz, Aachen (DE)

(73) Assignee: ZEITECS B.V., Rijswijk (NL)

( * ) Notice: Subject to any disclaimer, the term of this patent is extended or adjusted under 35 U.S.C. 154(b) by 522 days.

(21) Appl. No.: 13/921,861

(22) Filed: Jun. 19, 2013

(65) Prior Publication Data

US 2013/0341033 A1 Dec. 26, 2013

Related U.S. Application Data

(60) Provisional application No. 61/663,956, filed on Jun. 25, 2012.

(51) Int. Cl.
*E21B 43/12* (2006.01)
*F04D 3/02* (2006.01)
(Continued)

(52) U.S. Cl.
CPC ............ *E21B 43/121* (2013.01); *E21B 43/128* (2013.01); *F04D 3/02* (2013.01); *F04D 13/10* (2013.01); *H02K 5/132* (2013.01); *H02K 16/00* (2013.01)

(58) Field of Classification Search
CPC .. E21B 43/128; E21B 43/121; E21B 43/126; E21B 43/38; E21B 43/36; E21B 21/002; F04D 25/0686; F04D 13/10; F04D 13/086; F04D 3/02

USPC ............................................. 415/211.2, 220
See application file for complete search history.

(56) References Cited

U.S. PATENT DOCUMENTS 4,352,394 A 10/1982 Zehren
4,583,923 A 4/1986 James
(Continued)

FOREIGN PATENT DOCUMENTS

CN 1499947 A 5/2004
CN 201374627 Y 12/2009
(Continued)

OTHER PUBLICATIONS

PCT International Search Report and Written Opinion dated Aug. 1, 2013, International Application No. PCT/EP2013/063272.
(Continued)

*Primary Examiner* — David Andrews
*Assistant Examiner* — Tara Schimpf
(74) *Attorney, Agent, or Firm* — Michael Stonebrook

(57) ABSTRACT

A pump includes one or more stages, each stage including a tubular housing and a mandrel disposed in the housing. The mandrel includes a rotor rotatable relative to the housing and having: an impeller, a shaft, and one or more helicoidal blades on an outer surface of the impeller. The mandrel further includes a diffuser: connected to the housing, having the rotor shaft extending therethrough and having a plurality of vanes on an outer surface thereof. Each vane has an arcuate portion and a longitudinal portion. The diffuser further has a channel formed between an adjacent pair of vanes. The pump further includes a fluid passage formed between the housing and the mandrel.

20 Claims, 8 Drawing Sheets

(51) Int. Cl.
*F04D 13/10* (2006.01)
*H02K 5/132* (2006.01)
*H02K 16/00* (2006.01)

(56) References Cited

U.S. PATENT DOCUMENTS

| | | | |
|---|---|---|---|
| 4,928,771 A | 5/1990 | Vandevier | |
| 5,086,196 A | 2/1992 | Brookbank et al. | |
| 5,145,007 A | 9/1992 | Dinkins | |
| 5,191,173 A | 3/1993 | Sizer et al. | |
| 5,207,273 A | 5/1993 | Cates et al. | |
| 5,269,377 A | 12/1993 | Martin | |
| 5,708,337 A | 1/1998 | Breit et al. | |
| 5,769,160 A | 6/1998 | Owens | |
| 5,906,242 A | 5/1999 | Bruewer et al. | |
| 6,143,988 A | 11/2000 | Neuroth et al. | |
| 6,168,388 B1 | 1/2001 | Hughes et al. | |
| 7,396,216 B2 | 7/2008 | Blauch et al. | |
| 7,461,692 B1* | 12/2008 | Wang | B01D 19/0057 166/105.5 |
| 7,462,225 B1* | 12/2008 | Ketter | B01D 19/0057 166/105.5 |
| 7,857,604 B2 | 12/2010 | Shaw et al. | |
| 8,408,312 B2 | 4/2013 | Fielder et al. | |
| 2002/0153141 A1 | 10/2002 | Hartman et al. | |
| 2004/0183491 A1 | 9/2004 | Sidey | |
| 2004/0217665 A1 | 11/2004 | Hans | |
| 2006/0029495 A1 | 2/2006 | Ishii et al. | |
| 2006/0151211 A1 | 7/2006 | Coenen et al. | |
| 2007/0175633 A1 | 8/2007 | Kosmala et al. | |
| 2007/0196205 A1* | 8/2007 | Moriarty | F03B 13/02 415/191 |
| 2007/0252717 A1 | 11/2007 | Fielder | |
| 2008/0236821 A1 | 10/2008 | Fielder | |
| 2009/0010783 A1 | 1/2009 | Appel et al. | |
| 2009/0056939 A1 | 3/2009 | Hackworth et al. | |
| 2009/0175737 A1 | 7/2009 | Intelisano | |
| 2010/0206554 A1 | 8/2010 | Neuhaus et al. | |
| 2010/0288493 A1 | 11/2010 | Fielder et al. | |
| 2010/0288501 A1 | 11/2010 | Fielder et al. | |
| 2011/0297391 A1* | 12/2011 | Fielder | E21B 43/128 166/369 |
| 2011/0300008 A1 | 12/2011 | Fielder et al. | |

FOREIGN PATENT DOCUMENTS

| | | |
|---|---|---|
| CN | 201478959 U | 5/2010 |
| EP | 2295808 A2 | 3/2011 |
| GB | 2358740 A | 8/2001 |
| GB | 2445859 A | 7/2008 |
| JP | 2006037819 A | 2/2006 |
| JP | 2008175162 A | 7/2008 |
| SU | 1643794 | 4/1991 |
| WO | 2004/113670 A2 | 12/2004 |
| WO | 2006/136202 A1 | 12/2006 |
| WO | 2009077714 A1 | 6/2009 |
| WO | 2011156157 A2 | 12/2011 |

OTHER PUBLICATIONS

Baker Hughes—Centrilift Product Report, Alternative Deployed ESP System, Cable/Rod Deployed ESP Systems, Sep. 2008, 6 pages.
AU Application No. 2013283443, Patent Examination Report No. 1, dated Jul. 28, 2015, 2 pgs.
CA Application No. 2,875,914, First Office Action, dated Jan. 4, 2016, 9 pgs.
First Office Action issued in related CN application No. 201380034044 on Mar. 4, 2016, 10 pages.

* cited by examiner

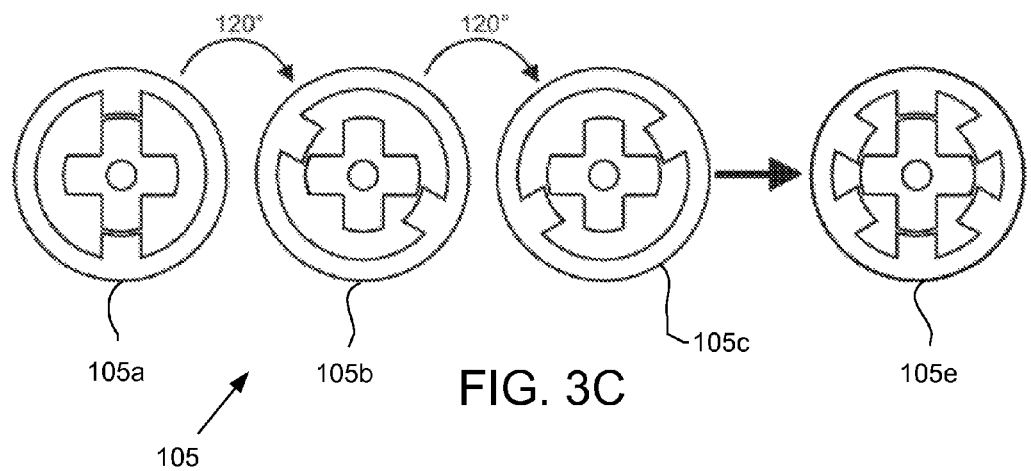
FIG. 3C
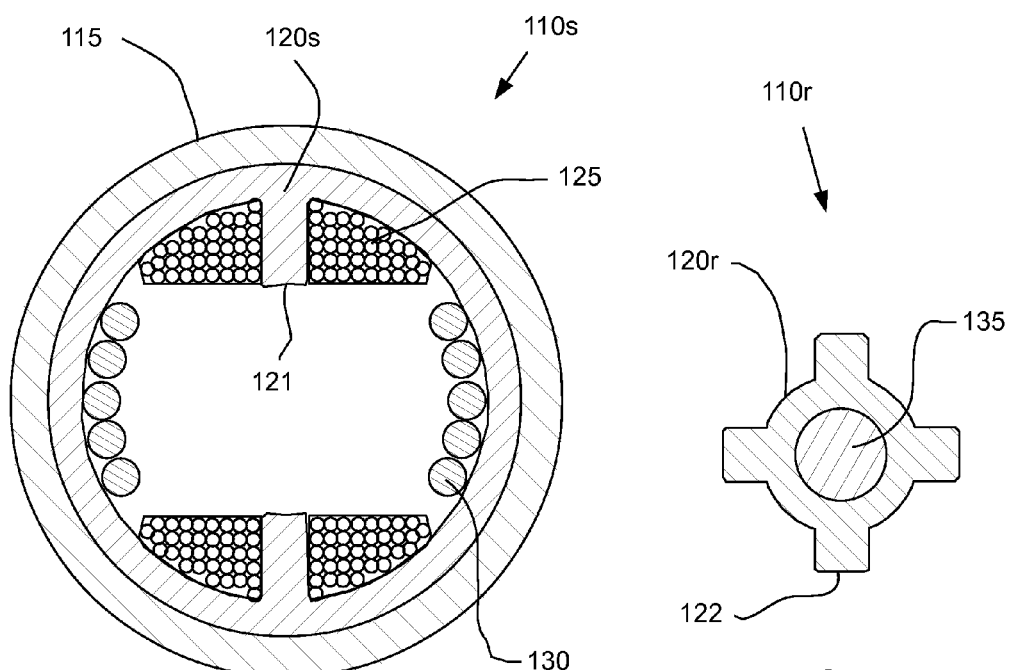
FIG. 3D
FIG. 3E

DIFFUSER FOR CABLE SUSPENDED DEWATERING PUMPING SYSTEM

BACKGROUND OF THE DISCLOSURE

1. Field of the Disclosure

Embodiments of the present disclosure generally relate to a diffuser for a cable suspended dewatering pumping system.

2. Description of the Related Art

As natural gas wells mature, many experience a decrease in production due to water build up creating back pressure on the reservoir. The gas industry has utilized varying technologies to alleviate this problem, however most do not meet the economic hurdle as they require intervention such as pulling the tubing string.

SUMMARY OF THE DISCLOSURE

Embodiments of the present disclosure generally relate to a diffuser for a cable suspended dewatering pumping system. In one embodiment, a pump includes one or more stages, each stage including a tubular housing and a mandrel disposed in the housing. The mandrel includes a rotor rotatable relative to the housing and having: an impeller, a shaft, and one or more helicoidal blades on an outer surface of the impeller. The mandrel further includes a diffuser: connected to the housing, having the rotor shaft extending therethrough and having a plurality of vanes on an outer surface thereof. Each vane has an arcuate portion and a longitudinal portion. The diffuser further has a channel formed between an adjacent pair of vanes. The pump further includes a fluid passage formed between the housing and the mandrel.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3C is a schematic of the multi-section motor mimicking operation of a multi-phase motor. FIG. 3D is a cross section of a stator of the motor. FIG. 3E is a cross section of a rotor of the motor.

DETAILED DESCRIPTION

Figure 1:
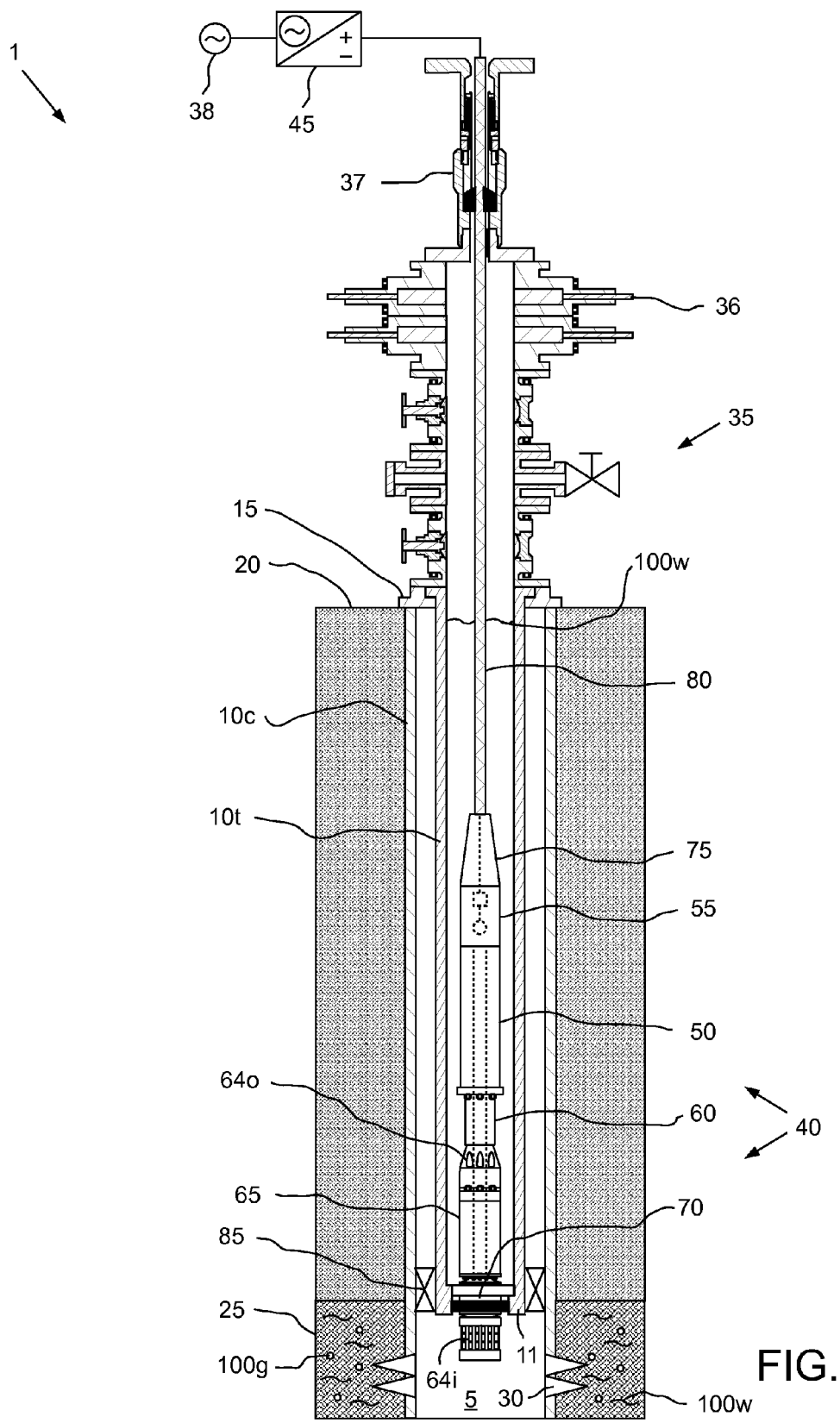
FIG. 1 illustrates an artificial lift system (ALS) deployed in a wellbore, according to one embodiment of the present disclosure.

FIG. 1 illustrates an artificial list system (ALS) 1 deployed in a wellbore 5, according to one embodiment of the present disclosure. The wellbore 5 has been drilled from a surface 20 of the earth into a hydrocarbon-bearing (i.e., natural gas or coal bed methane 100g) reservoir 25. A string of casing 10c has been run into the wellbore 5 and set therein with cement (not shown). The casing 10c has been perforated 30 to provide fluid communication between the reservoir 25 and a bore of the casing 10c. A wellhead 15 has been mounted on an end of the casing string 10c. A production tubing string 10t has been run into the wellbore 5 and hung from the wellhead 15. A production packer 85 has been set to isolate an annulus between the tubing 10t and the casing 10c from the reservoir 25. A production tree 35 has been mounted on the wellhead 35 and a production line (not shown) may extend from a choke valve of the tree to production equipment (not shown), such as a separator. The reservoir 25 may be self-producing until a pressure of the gas 100g is no longer sufficient to transport a liquid, such as water 100w, to the surface. The water 100w may be fresh or brine. A level of the water 100w has built in the production tubing 10t, thereby exerting hydrostatic pressure on the reservoir 25 and diminishing flow of gas 100g from the reservoir 25.

Alternatively, the wellbore 5 may be subsea. Alternatively, the casing 10c may be used to produce the gas 100g from the reservoir 25 instead of installing the production tubing string 10t.

The ALS 1 may include a surface controller 45, a power cable 80, and an electric submersible pump (ESP) 40. To deploy the ESP 40 into the wellbore 5, a blowout preventer 36 and a lubricator 37 may be connected to the production tree 35. The ESP 40 may include an electric motor 50, a power conversion module (PCM) 55, a seal section 60, an inlet 64i, a multiphase pump 65, an outlet 64o, a lander 70, and a cablehead 75. Housings the ESP components may be longitudinally and torsionally connected, such as with flanged or threaded connections. Shafts of the motor 50, seal section 60, and pump 65 may be torsionally connected, such as by splined couplings. The ESP housings may be made from a corrosion resistant metal or alloy, such as galvanized steel, stainless steel, or a nickel based alloy. Since the ESP 40 may be deployed within the production tubing string 10t, the ESP may be compact, such as having a maximum outer diameter less than or equal to two or one and three-quarter inches (depending on the inner diameter of the tubing 10t).

The production tubing string 10t may have a landing nipple 11 formed at a lower end thereof. The landing nipple 11 may have a seal bore, a torsional coupling, such as an auto-orienting castellation, and a stop shoulder. The lander 70 may have a tubing seal, a torsional coupling, such as an auto-orienting castellation, and a stop shoulder. Engagement of the lander 70 with the landing nipple 11 may engage the tubing seal with the seal bore, align the castellations, and engage the stop shoulders, thereby longitudinally supporting the ESP 40 from the production tubing string 10t, torsionally connecting the ESP to the production tubing string, and isolating the inlet 64i from the outlet 64o.

Alternatively, the ESP may include an isolation device having an anchor and a packer instead of the lander 70.

The surface controller 45 may be in electrical communication with an alternating current (AC) power source 38, such as a generator on a wireline truck (not shown). The surface controller 45 may include a transformer (not shown) for stepping the voltage of the AC power signal from the power source 38 to a medium voltage (V) signal. The medium voltage may be greater than or equal to one kV, such as five to ten kV. The surface controller 45 may further include a rectifier for converting the medium voltage AC signal to a medium voltage direct current (DC) power signal for transmission downhole via the power cable 80. The surface controller 45 may further include a data modem (not shown) and a multiplexer (not shown) for modulating and multiplexing a data signal to/from the PCM 55 with the DC power signal. The surface controller 45 may further include an operator interface (not shown), such as a video-display, touch screen, and/or USB port.

The cable 80 may extend from a winch of the wireline truck, through the lubricator 37, BOP 36, production tree 35, wellhead 15, and production tubing string 10*t* to the cablehead 75. The cable 80 may be electrically connected to the surface controller 45 via leads. Since the power signal may be DC, the cable 80 may only include two conductors arranged coaxially. Due to the coaxial arrangement, the cable 80 may have an outer diameter 250 less than or equal to one and one-quarter inches, one inch, or three-quarters of an inch.

Figures 2A, 2B:
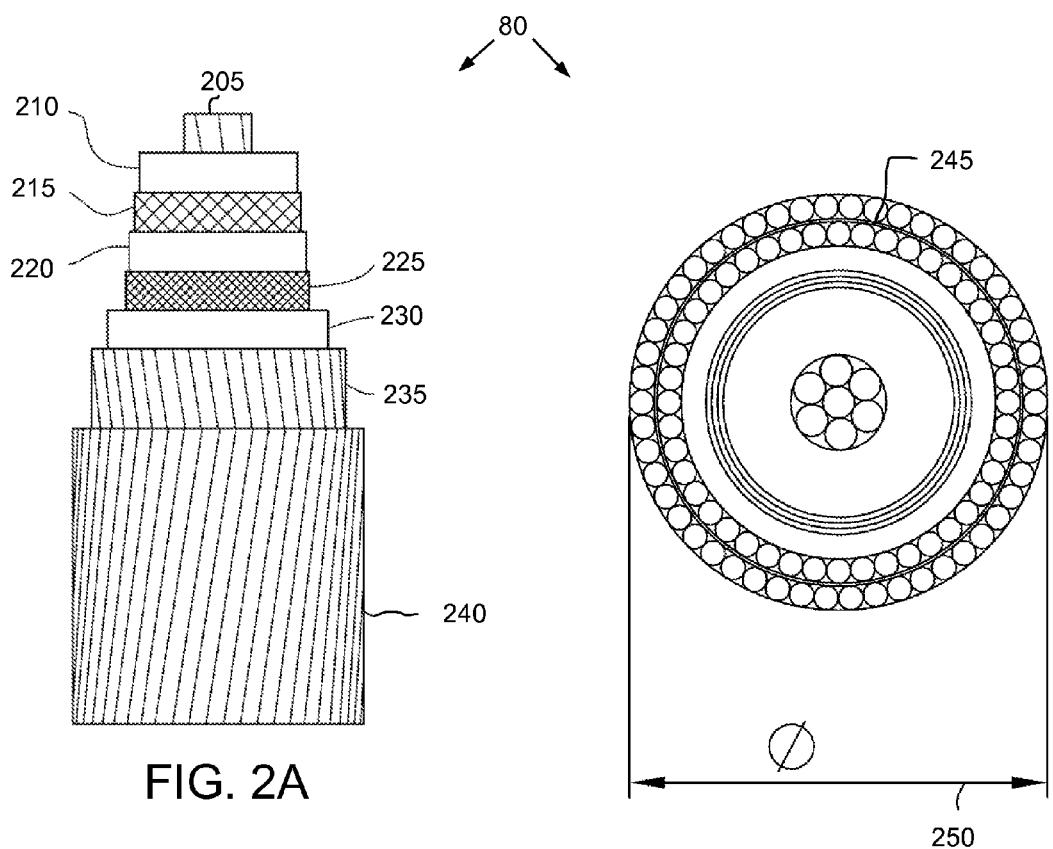
FIG. 2A is a layered view of a power cable of the ALS.
FIG. 2B is an end view of the power cable.

FIG. 2A is a layered view of the power cable 80. FIG. 2B is an end view of the power cable 80. The cable 80 may include an inner core 205, an inner jacket 210, a shield 215, an outer jacket 230, and armor 235, 240. The inner core 205 may be the first conductor and made from an electrically conductive material, such as aluminum, copper, aluminum alloy, or copper alloy. The inner core 205 may be solid or stranded. The inner jacket 210 may electrically isolate the core 205 from the shield 215 and be made from a dielectric material, such as a polymer (i.e., an elastomer or thermoplastic). The shield 215 may serve as the second conductor and be made from the electrically conductive material. The shield 215 may be tubular, braided, or a foil covered by a braid. The outer jacket 230 may electrically isolate the shield 215 from the armor 235, 240 and be made from an oilresistant dielectric material. The armor may be made from one or more layers 235, 240 of high strength material (i.e., tensile strength greater than or equal to two hundred kpsi) to support the ESP deployment weight (weight of the cable 80 and the weight of the ESP 40) so that the cable 80 may be used to deploy and remove the ESP 40 into/from the wellbore 5. The high strength material may be a metal or alloy and corrosion resistant, such as galvanized steel, stainless steel, or a nickel alloy depending on the corrosiveness of the gas 100*g*. The armor may include two contrahelically wound layers 235, 240 of wire or strip.

Additionally, the cable 80 may include a sheath 225 disposed between the shield 215 and the outer jacket 230. The sheath 225 may be made from lubricative material, such as polytetrafluoroethylene (PTFE) or lead and may be tape helically wound around the shield 215. If lead is used for the sheath, a layer of bedding 220 may insulate the shield 215 from the sheath and be made from the dielectric material. Additionally, a buffer 245 may be disposed between the armor layers 235, 240. The buffer 245 may be tape and may be made from the lubricative material.

Additionally, the cable 80 may further include a pressure containment layer (not shown) made from a material having sufficient strength to contain radial thermal expansion of the dielectric layers and wound to allow longitudinal expansion thereof. The material may be stainless steel and may be strip or wire. Alternatively, the cable 80 may include only one conductor and the tubing 10*t* may be used for the other conductor.

The cable 80 may be longitudinally connected to the cablehead 75. The cablehead 75 may also include leads extending therethrough. The leads may provide electrical communication between the conductors 205, 215 of the cable 80 and the PCM 55.

Figures 3A, 3B:
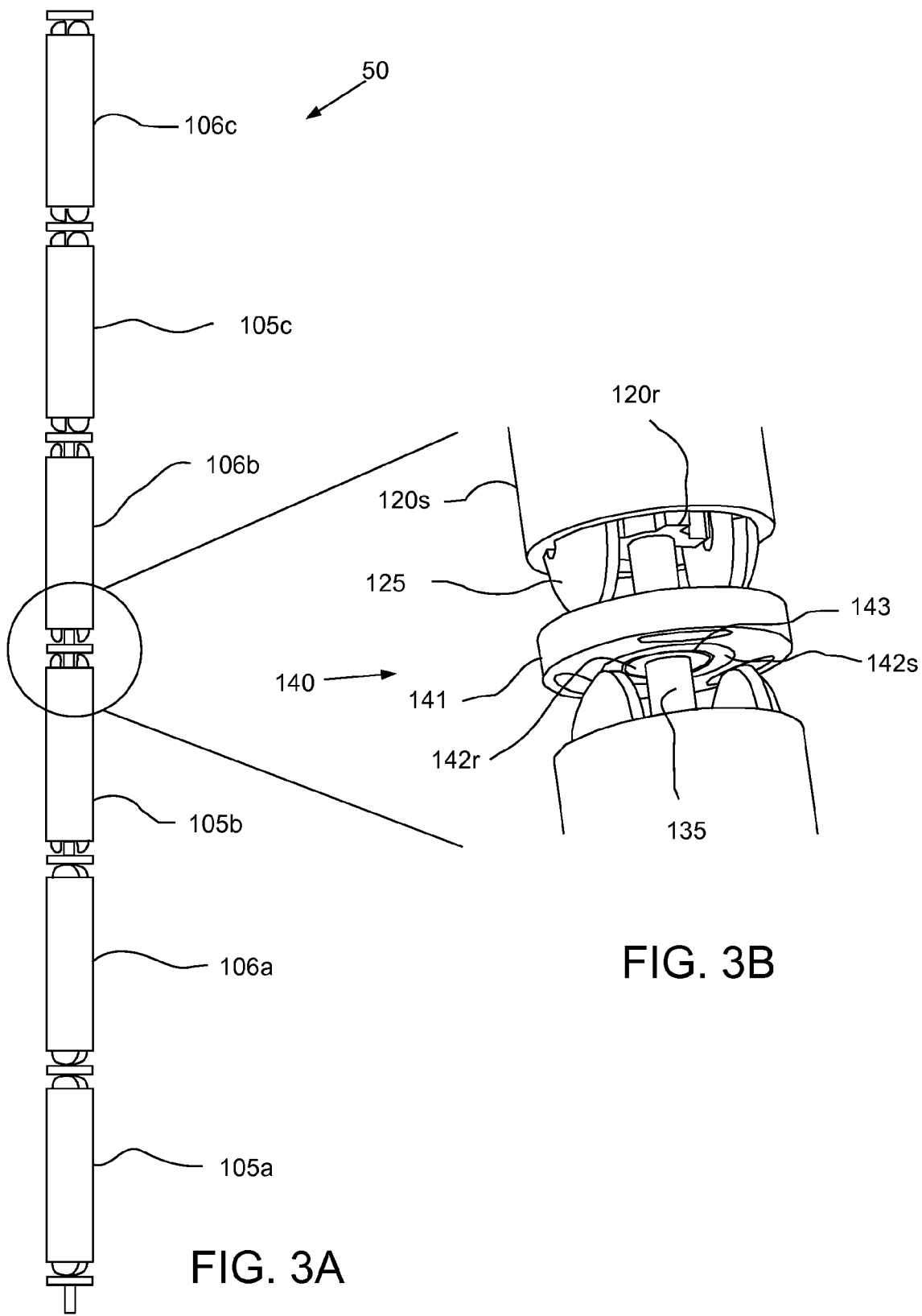
FIG. 3A is an external view of a multi-section motor of the ALS minus the housing.
FIG. 3B is an enlargement of a portion of FIG. 3A.

FIG. 3A is an external view of the motor 50 minus the housing. FIG. 3B is an enlargement of a portion of FIG. 3A. FIG. 3C is a schematic of the multi-section motor 50 mimicking operation of a multi-phase motor. FIG. 3D is a cross section of the stator 110*s*. FIG. 3E is a cross section of the rotor 110*r*.

The motor 50 may be filled with a dielectric, thermally conductive liquid lubricant, such as motor oil. The motor 50 may be cooled by thermal communication with the reservoir water 100*w*. The motor 50 may include a thrust bearing (not shown) for supporting a drive shaft 135. In operation, the motor 50 may rotate the shaft 135, thereby driving the multiphase pump 65. The motor shaft 135 may be directly (no gearbox) connected to a rotor 160 (FIG. 4A) of the pump via a shaft of the motor seal 60. As discussed above, since the motor 50 may be compact, the motor may operate at high speed so that the pump may generate the necessary head to pump the water 100*w* to the surface 20. High speed may be greater than or equal to ten, fifteen, or twenty thousand revolutions per minute (RPM).

The motor 50 may include two or more sections 105*a*-*c*, 106*a*-*c*. Each section 105*a*-*c*, 106*a*-*c* may include a rotor 110*r* and a stator 110*s*. The stator 110*s* may include the housing 115, a core 120*s*, windings 125, and leads 130. The housing 115 may be tubular and have a bore therethrough. Housings of each section 105*a*-*c*, 106*a*-*c* may be longitudinally and torsionally connected, such as by flanges or threads (not shown). The core 120*s* may include one or more lobes 121 (two shown). Each lobe 121 may be wound and the windings 125 of opposing lobes 121 may be connected (not shown) in series or parallel to define a phase. The motor 50 may further include one or more sets, such as a first set 105 and a second set 106 (not shown) of sections 105*a*-*c*, 106*a*-*c*. The stator 110*s* of each section 105*a*-*c*, 106*a*-*c* may be incrementally oriented relative to the other stators of the respective set 105, 106 based on a three-hundred and sixty degree sum. For example, for three sections, each section 105*a*-*c*, 106*a*-*c* may be shifted by one-hundred twenty degrees relative to other sections of the respective set 105, 106. Alternatively, each rotor 110*r* of each section 105*a*-*c*, 106*a*-*c* may be shifted instead of shifting the stators 110*s*.

Each section 105*a*-*c*, 106*a*-*c* may be electrically connected to the PCM 55 by the leads 130. Respective sections (i.e., 105*a*, 106*a*) of each set 105, 106 may correspond, thereby operating as a single phase. The corresponding sections of the sets 105, 106 may be electrically connected to the PCM 55 in parallel or series. Shifted sections (i.e., 105*a, b*) of each set 105, 106 may be connected to the PCM 55 in parallel. Each set 105, 106 may be controlled by the PCM 55 to mimic one or more multi-phase motors 105*e* (may be viewed as a single motor or two motors in series), such as a three-phase (six stator lobes) motor. Other than for the orientation, each of the sections 105*a*-*c*, 106*a*-*c* may be identical, thereby forming a modular motor 50.

The motor 50 may be a switched reluctance motor (SRM). Each rotor 110*r* may include a shaft 135 and a core 120*r*. The shaft 135 may be made from a metal or alloy, such as plain carbon or low alloy steel, stainless steel, or a nickel based alloy. The core 120*r* may have two or more lobes 122, such as four, each spaced apart by ninety degree increments. Each of the cores 120*s*, 120*r* may be laminates. Each layer of the laminates may be made from a metal or alloy, such as silicon steel. The layers may be aligned and then pressed together to form one of the cores 120*r,s*. The windings 125 may then be wrapped around each lobe 121. The stator core 120*s* may be longitudinally and rotationally connected to the housing 115, such as by a key and keyway (not shown) and fasteners. The housing 115 may include an external indicator (not shown), such as a groove or protrusion, to facilitate orientation of the sections 105a-c, 106a-c with respect to one another. The rotor core 120r may be longitudinally and torsionally connected to the shaft 135, such as by a key, keyway, and fasteners or an interference fit. Each of the leads 130 and windings 125 may include a core made from an electrically conductive material, as discussed above, and be jacketed by a dielectric material, as discussed above.

Each section 105a-c, 106a-c may further include a bearing 140, such as a radial bearing, for supporting rotation of the shaft 135 relative to the housing 115. The bearing 140 may be a rolling element bearing, such as a ball bearing. The bearing 140 may include a gland 141 housing an outer race 142s. The gland 141 may be connected (not shown) to the housing 115 and the outer race 142s connected to the gland 141. The bearing 140 may further include an inner race 142r connected to the shaft 135. Balls 143 (schematically shown) may be disposed between the races 142r,s and lubricant may be sealed within the races. Alternatively, the bearing 140 may be a hydrodynamic bearing, as discussed below.

The PCM 55 may include a motor controller (not shown), a modem, and demultiplexer. The modem and demultiplexer may demultiplex a data signal from the DC power signal, demodulate the signal, and transmit the data signal to the motor controller. The motor 50 may further include one or more rotor position sensor, such as one or more targets embedded in the rotor core 120r and one or more proximity sensors disposed in the stator 110s for generating a Hall output in response to detection of the targets. The motor controller may include a microcontroller in communication with the proximity sensors and a switching circuit. The motor controller may receive the medium voltage DC signal from the cable 80 and sequentially energize the shifted sections 105a-c (& 106a-c) of the motor 50, thereby supplying an output signal to drive the particular section of the motor and coordinating operation of each set of sections as a multi-phase motor. The output signal may be stepped, trapezoidal, or sinusoidal. The motor controller may use one or two-phase excitation, be unipolar or bi-polar, and control the speed of the motor using the proximity sensors. The motor controller may include an asymmetric bridge or half-bridge.

Alternatively, the motor controller may monitor back EMF from the motor to determine rotor position sensorlessly. Alternatively, the motor 50 may be permanent magnet motor, such as a brushless DC motor (BLDG) made in a similar multi-section fashion.

Alternatively, the PCM 55 may include a power supply (not shown). The power supply may include one or more DC/DC converters, each converter including an inverter, a transformer, and a rectifier for converting the DC power signal into an AC power signal and stepping the voltage from medium to low, such as less than or equal to one kV. The power supply may include multiple DC/DC converters in series to gradually step the DC voltage from medium to low. The low voltage DC signal may then be supplied to the motor controller for driving the motor 50.

The motor controller may be in data communication with one or more sensors (not shown) distributed throughout the ESP 50. A pressure and/or temperature (PT) sensor may be in fluid communication with the water 100w entering the inlet 64i. A gas to liquid ratio (GLR) sensor may be in fluid communication with the water 100w entering the inlet 64i. A second PT sensor may be in fluid communication with the water 100w discharged from an outlet 65o. A temperature sensor (or PT sensor) may be in fluid communication with the lubricant to ensure that the motor and downhole controller are being sufficiently cooled. Multiple temperature sensors may be included in the PCM 55 for monitoring and recording temperatures of the various electronic components. A voltage meter and current (VAMP) sensor may be in electrical communication with the cable 80 to monitor power loss from the cable. A second VAMP sensor may be in electrical communication with the motor controller output to monitor performance of the motor controller. Further, one or more vibration sensors may monitor operation of the motor 50, the multiphase pump 65, and/or the seal section 60. A flow meter may be in fluid communication with the outlet 65o for monitoring a flow rate of the pump 65. Utilizing data from the sensors, the motor controller may monitor for adverse conditions, such as pump-off, gas lock, or abnormal power performance and take remedial action before damage to the pump 65 and/or motor 50 occurs.

The seal section 60 may isolate the water 100w being pumped through the pump 65 from the lubricant in the motor 50 by equalizing the lubricant pressure with the pressure of the water 100w. The shaft of the seal section 60 may torsionally connect the motor shaft 135 to the pump shaft. The seal section 60 may house a thrust bearing capable of supporting thrust load from the pump 65. The seal section 60 may be positive type or labyrinth type. The positive type may include an elastic, fluid-barrier bag to allow for thermal expansion of the motor lubricant during operation. The labyrinth type may include tube paths extending between a lubricant chamber and a water chamber providing limited fluid communication between the chambers.

The inlet 64i may include a plurality of ports allowing a multiphase mixture 100m (FIG. 4A) of the water 100w and the gas 100g to enter the pump 65 from the perforations 30. The multiphase mixture 100m may also have gas 100g dissolved in the water 100w. The inlet 64i may include a screen to filter particulates from the multiphase mixture 100m. The outlet 64o may include a plurality of ports allowing the multiphase mixture 100m to be discharged from the pump 65 into an annulus formed between the ESP 40 or cable 80 and the production tubing string 10t.

Figure 4A:
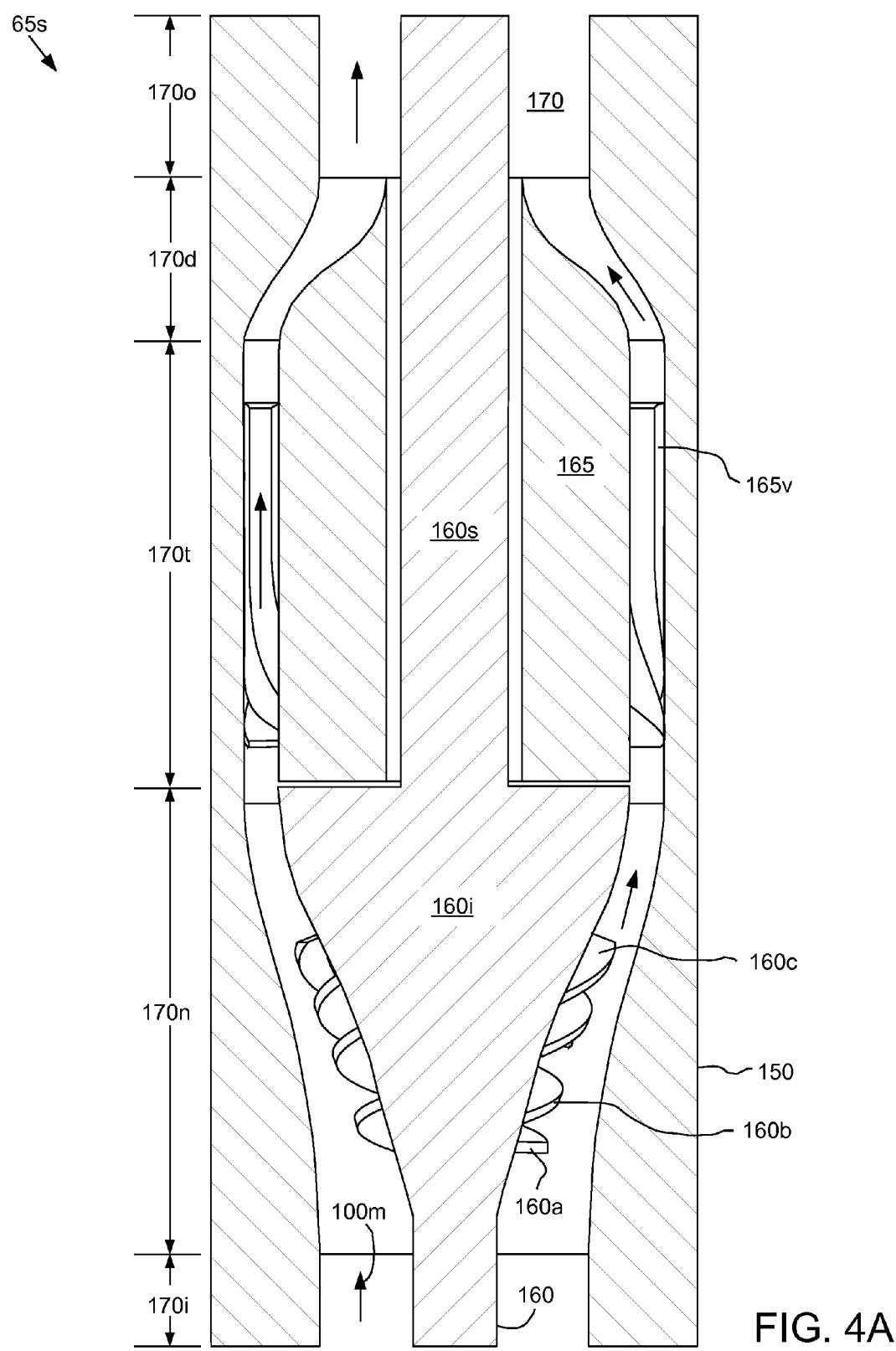
FIG. 4A is a cross-section of a pump stage of the ALS.
Figure 4B:
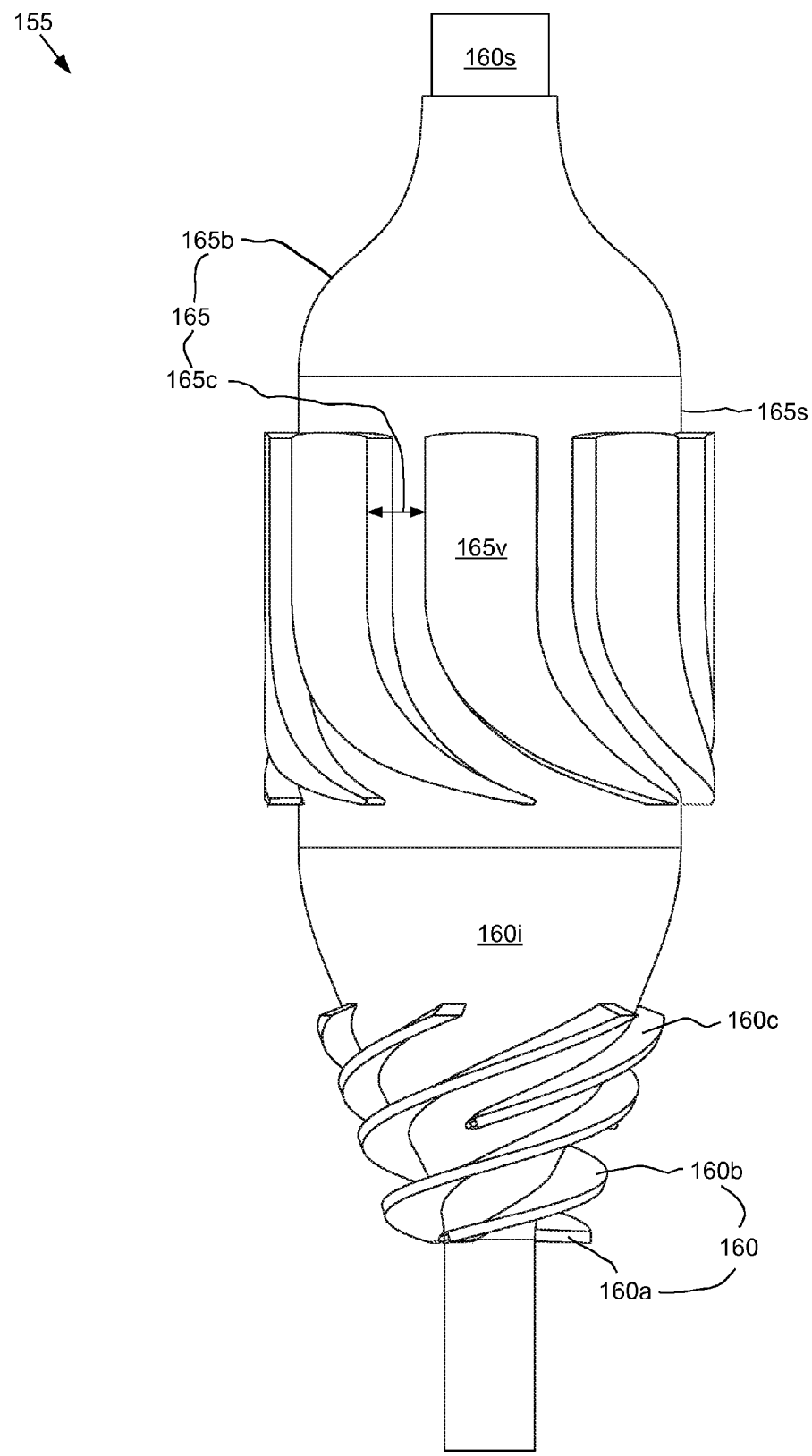
FIG. 4B is an external view of a mandrel of the pump stage.
Figure 4C:
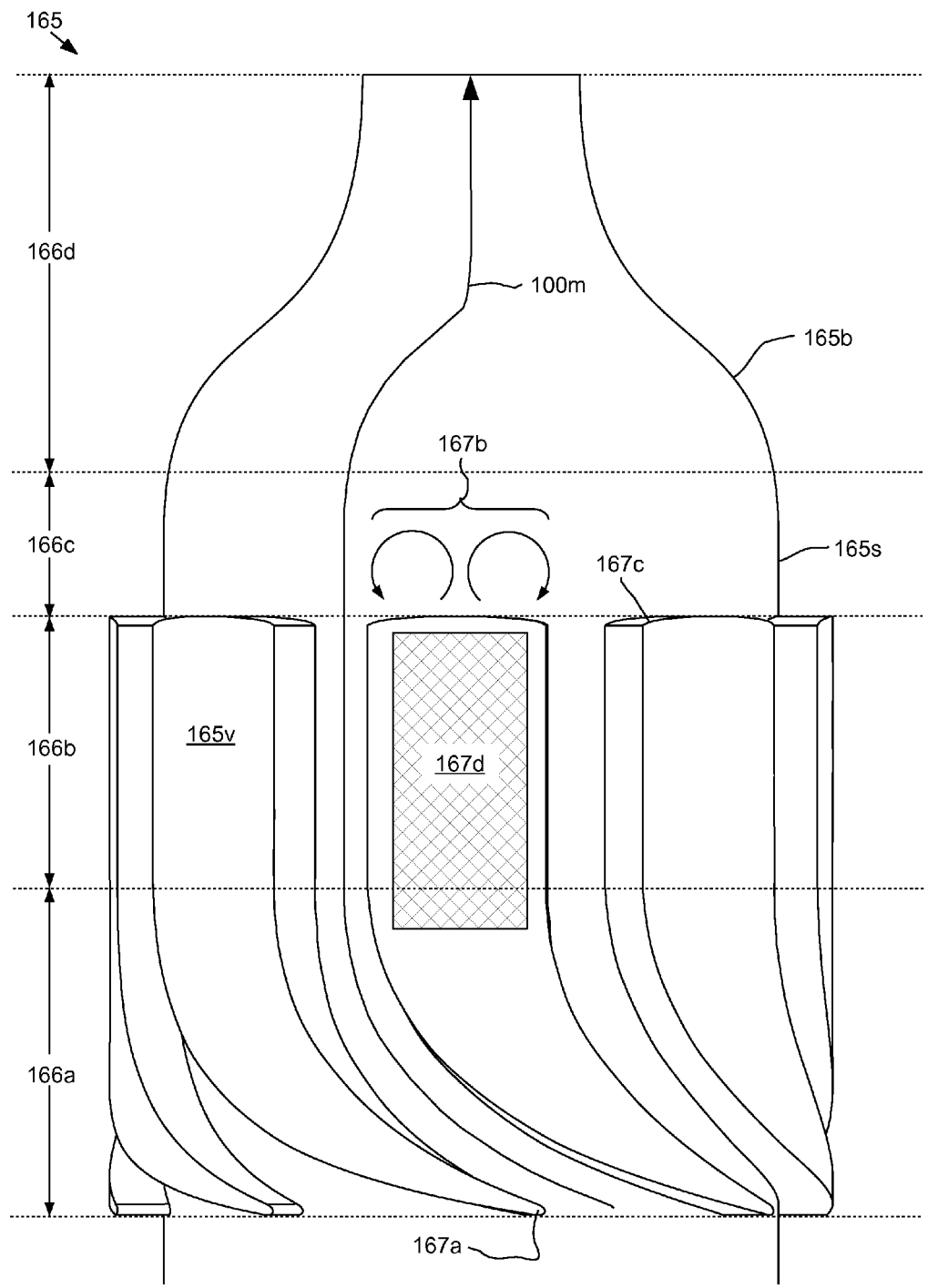
FIG. 4C is an enlargement of a diffuser of the mandrel.
Figure 4D:
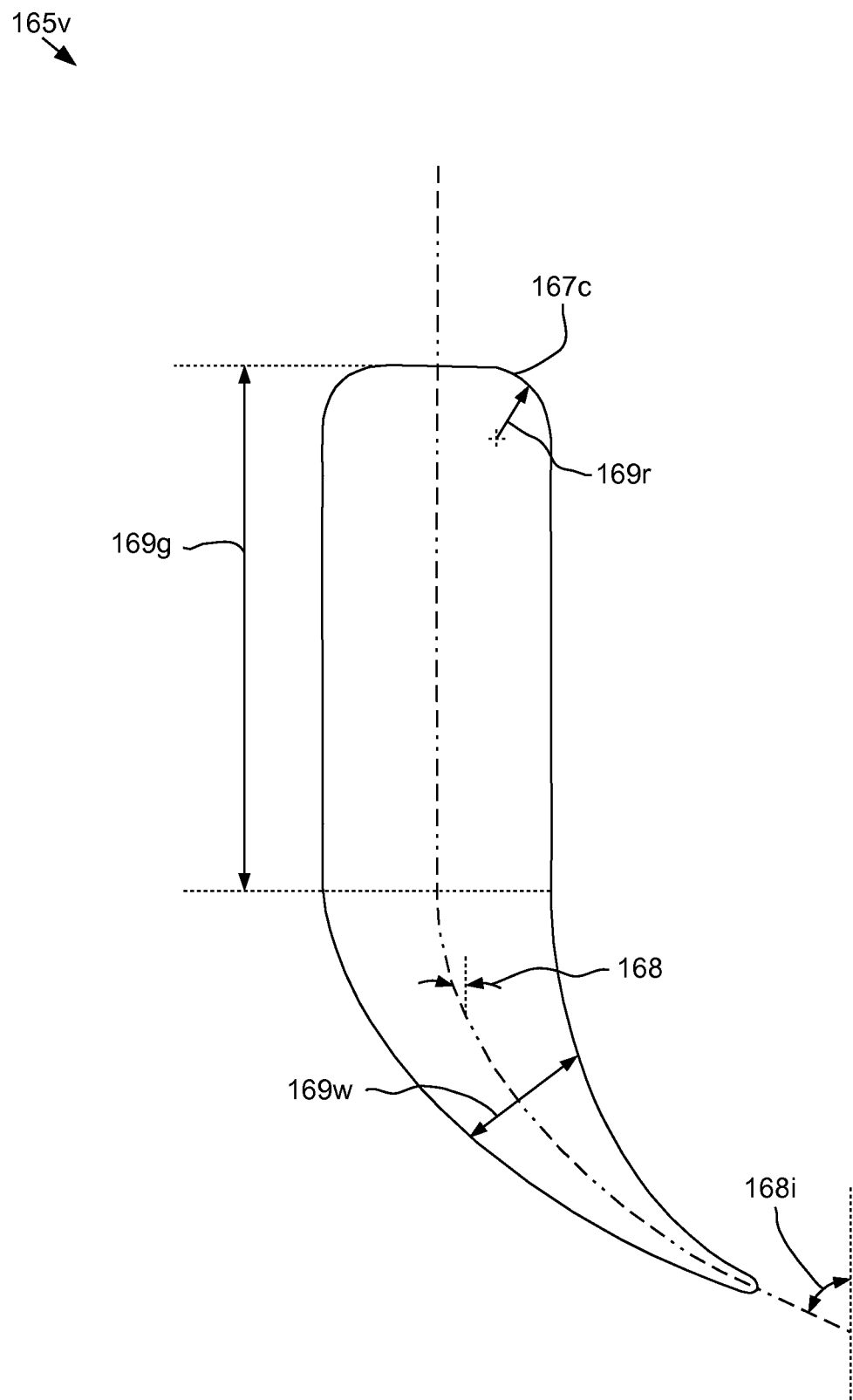
FIG. 4D illustrates geometry of a vane of the diffuser.

FIG. 4A is a cross-section of a stage 65s of the pump 65. FIG. 4B is an external view of a mandrel 155 of the pump stage 65s. FIG. 4C is an enlargement of a diffuser 165 of the mandrel 155. FIG. 4D illustrates geometry of a vane 165v of the diffuser. The pump 65 may include one or more stages 65s, such as two to six. Housings of each stage 65s may be longitudinally and torsionally connected, such as with threaded couplings or flanges (not shown). Each stage 65s may include a housing 150, a mandrel 155, and an annular passage 170 formed between the housing and the mandrel. The housing 150 may be tubular and have a bore therethrough. The mandrel 155 may be disposed in the housing 150. The mandrel 155 may include a rotor 160 and a diffuser 165. The rotor 160, housing 155, and diffuser 165 may each be made from a metal, alloy, or cermet corrosion and erosion resistant to the production fluid, such as steel, stainless steel, or a specialty alloy, such as chrome-nickel-molybdenum. Alternatively, the rotor, housing, and diffuser may be surface-hardened or coated to resist erosion.

The rotor 160 may include a shaft portion 160s and an impeller portion 160i. The portions 160i,s may be integrally formed. Alternatively, the portions 160i,s may be separately formed and longitudinally and torsionally connected, such as by threaded couplings. The rotor 160 may be supported from the diffuser 165 for rotation relative to the diffuser and the housing 150 by a hydrodynamic radial bearing (not shown) formed between an inner surface of the diffuser and an outer surface of the shaft portion 160s. The radial bearing may utilize the pumped multiphase mixture 100m or may be isolated from the pumped mixture by one or more dynamic seals, such as mechanical seals, controlled gap seals, or labyrinth seals.

Alternatively, the diffuser may have a lubricant reservoir chamber formed in a wall thereof in fluid communication with the hydrodynamic bearing. Alternatively, one or more rolling element bearings, such as ball bearings (see bearing 140, discussed above), may be disposed between the diffuser 165 and shaft portion 160s instead of the hydrodynamic bearings.

The rotor 160 may have one or more helicoidal blades 160a-c on an outer surface of the impeller portion 160i. The rotor blades 160a-c may be formed during manufacture of the rotor 160 or deposited on an outer surface of the impeller portion 160i after the rotor is formed, such as by spraying or weld-forming. The rotor blades 160a-c may interweave to form a pumping cavity therebetween. The rotor 160 may be longitudinally and torsionally coupled to the motor drive shaft and be rotated by operation of the motor 50. As the rotor 160 is rotated, the multiphase mixture 100m may be pumped along the cavity from the inlet 170i toward the outlet 170o.

For a multistage pump, the diffuser 165 may have a lower cylindrical portion 165s and an upper arcuate portion 165b. The arcuate portion 165b may be omitted for a single stage pump or for the final stage of a multistage pump. An outer diameter of the impeller 160i may increase from the inlet 170i toward the outlet 170o in a curved fashion until the impeller outer diameter corresponds to an outer diameter of the diffuser cylindrical portion 165s (excluding vanes 165v). An inner diameter of the housing 150 facing the impeller portion 160i may increase from the inlet 170i to the outlet 170o and the housing inner surface may converge toward the impeller outer surface, thereby decreasing an area of the passage 170 and forming a convergent nozzle 170n. As the multiphase mixture 100m is forced through the convergent nozzle 170n by the rotor blades 160a-c, a velocity of the mixture may be increased.

The stator may include the housing 150 and the diffuser 165. The diffuser 165 may be tubular and have a bore therethrough. The rotor 160 may have a shoulder between the impeller 160i and shaft 160s portions facing a lower end of the diffuser 165. The shaft portion 160s may extend through the diffuser bore. The diffuser 165 may be longitudinally and torsionally connected to the housing 150.

An outer diameter of the diffuser cylindrical portion 165s (excluding vanes 165v) and an inner diameter of the housing 150 may remain constant, thereby forming a throat 170t of the passage 170. An outer diameter of the diffuser 165 may decrease away from the inlet 170i to the outlet 170o in a curved fashion until an end of the diffuser 165 is reached and an outer surface of the shaft portion 160s is exposed to the passage 170. An inner diameter of the housing 150 facing the diffuser 165 may decrease away from the inlet 170i to the outlet 170o and the housing inner surface may diverge from the diffuser outer surface, thereby increasing an area of the passage 170 and forming a divergent nozzle 170d. As the multiphase mixture 100m flows through the divergent nozzle 170d, a velocity of the mixture may be decreased. Inclusion of the Venturi 170n,t,d may also minimize fluid energy loss in the multiphase mixture 100m discharged from the rotor blades 160a-c.

The diffuser 165 may have a plurality of vanes 165v on an outer surface of the cylindrical portion 165s. The diffuser vanes 165v may be formed during manufacture of the diffuser 165 or deposited on an outer surface of the cylindrical portion 165s after the diffuser is formed, such as by spraying or weld-forming. Each diffuser vane 165v may have an upper longitudinally straight portion 166b and a lower arcuate portion 166a (see also angle 168i in FIG. 4D), thereby imparting a mixed radial and longitudinal flow nature to the diffuser 165. The diffuser vanes 165v may be incrementally spaced around the cylindrical portion 165s, thereby forming channels 165c between adjacent vanes. The lower portion 166a of the diffuser vanes 165v may curve in a direction opposite that of the rotor blades 160a-c, thereby negating swirl in the flow of the multiphase mixture 100m caused by the rotor blades 160a-c and minimizing energy loss due to turbulent flow of the mixture.

As the multiphase mixture 100m exits the convergent nozzle 170n into the throat 170t, the arcuate portion 166a of the vanes 165v may redirect the mixture flow through the channels 165c toward the longitudinal direction. Portions of the channels 165c in the curved portion 166a may have a nearly constant area with only a slight increase to account for boundary layer growth. A leading edge 167a of each vane 165v may have a very small radius to minimize the blockage for the incoming flow. An inclination 168 of the vanes 165v may be adapted to the flow angle of the impeller vanes 160a-c to discharge flow at the designed mass flow rate and pressure differential.

As the multiphase mixture 100m flows along the channels 165c from the arcuate portion 166a of the vanes 165v into the longitudinal portion 166b thereof, the flow may equalize. Portions of the channels 165c in to the longitudinal portion 166b may have a constant area and a width substantially less than, such as one-fifth to one-seventh, a length 169g of the longitudinal portion 166b, thereby minimizing the pressure gradient between the suction side and the discharge side of the channels 165c to obstruct separation of the multiphase mixture 100m.

The multiphase mixture 100m may exit the channels 165c from the arcuate portion 166a of the vanes 165v into a recirculation zone 166c. An upper end of each vane 165v may have two rounded edges 167c having small radii 169r. These small radii 169r may generate counter-rotating mixing vortexes 167b in the recirculation zone 166c to further prevent flow separation.

The multiphase mixture 100m may exit the recirculation zone 166c and flow into a diffusion zone 166d. In the diffusion zone 166d, the flow may be mixed outwardly and the increase in flow area may result in additional pressure rise. The divergent nozzle 170d formed between the housing 150 and the arcuate portion 166d may also serve to guide flow of the multiphase mixture 100d to the outlet 170o and inlet of the subsequent stage.

To form the channels 165c, a width 169w of each vane may increase from the leading edge 167a to the longitudinal portion 166b. The increased width at the longitudinal portion 166b may serve as a coupling area 167d. The coupling area 167d may provide access to the mandrel 155 for servicing of the pump 65. The coupling area 167d may also be used for the connection of the diffuser 165 to the housing 150 (and transfer of bearing load from the rotor 160 to the housing 150) and/or supply of lubricant and/or buffer fluid.

Advantageously, the diffuser 165 may have a small outer diameter and at the same time the ability to redirect flow over a large change in flow angle without flow separation. This feature may facilitate the rotor 160 to turn at high rotational speeds, creating a pump 65 with high pressure build-up and simultaneously a small outer diameter. These qualities may make the proposed diffuser design suitable for applications with limited space, as for example submersible pumps used for gas well dewatering. The flow dynamic strategy of the diffuser may be to split up the area of flow redirection and flow diffusion. In the lower part of the vaned channels 165c, the flow redirection may take place whereas in the upper part of the vaned channels and vaneless longitudinal part 166c, the diffusion and mixing of the fluid may take place.

Thereby, the design may be less sensitive to separation of the multiphase mixture 100m.

Advantageously, the design of the diffuser 165 may ensure a stable and swirl-free outlet flow over a wide operation range. A swirl-free flow at the exit of the vaned part of the diffuser 165 may facilitate use of the diffusion zone 166d. The diffusion zone 166d may reduce the average flow channels radius. If the flow were swirled, the diffusion zone 166d would impact an acceleration of the circumferential components which would reduce the pressure build-up of the system. Also for a swirled flow, the diffusion zone 166d would increase flow losses due to a longer flow path and evoke an unwanted pre-swirl to the following impeller inlet. The positive impact of swirl-free flow at the exit of the vaned part may make the diffuser suitable for the use in multi-stage repeating pump systems enabling arbitrary pressure ratios.

Advantageously, two design characteristics may be beneficial for the multi-phase capabilities of the diffuser 165. Since the diffuser inlet flow may have a high circumferential velocity (high rotational speed of the impeller 165i), the redirection of the diffuser vane may need to be large. This would result in flow separation with any kind of conventional longitudinal blades. Firstly, by avoiding flow separation, phase separation may also be limited. This may be achieved by keeping the through-flow area near to constant. Furthermore, the velocity of the flow inside the vaned diffuser part may be kept high, resulting in high shear and homogeneity of the multiphase-flow. Secondly, the abruptly controlled expansion and induced counter-rotating vortexes within the recirculation zone 166c at the thick trailing edge of each vane 165v may additionally support the mixture of the flow.

Furthermore, the diffuser 165 may offer advantages in terms of assembly and mechanical load. The solid material of the coupling area 167d may allow easy and solid connection of the mandrel 155 to the housing 150 as compared to thin longitudinal blades. Thereby bearing reactions may be transferred by simple and robust construction elements like fasteners. This eliminates the usage of more complex joining techniques (for example welding) which are often non-detachable and more expensive. At the same time an easy access to the mandrel 155 may also facilitate sensors, oil supply, or other supporting systems.

In operation, to install the ESP 40, the ALS 1 may be deployed to the wellsite. The BOP may be connected to the tree 35. The ESP 40 may be inserted into the lubricator and the cable connected to the cablehead 75. The lubricator 37 may then be connected to the tree 35. The cable 80 may then be unwound thereby lowering the ESP 40 into the wellbore 5 inside of the production tubing 10t. Once the ESP has reached the landing nipple 11, the motor 50 may then be started to drive the pump 65. As the pump 65 is operating, the motor controller may send data from the sensors to the surface so that the operator may monitor performance of the pump. If the motor controller is variable, a speed of the motor 50 may be adjusted to optimize performance of the pump 65. The pump 65 may pump the mixture 100m through the production tubing 10t and the wellhead 15 into the production line, thereby lowering a level of the water 100w and reducing hydrostatic pressure of the water on the formation 25. The pump 65 may be operated until the water level is lowered to the landing nipple 11, thereby allowing natural production from the reservoir 25. The operator may then send instructions to the motor controller to shut down the pump 65 or simply cut power to the cable 80. The cable 80 may be wound, thereby raising the ESP 40 from the wellbore 5. The ALS 1 may then be deployed to another wellsite.

Advantageously, deployment of the ESP 40 using the cable 80 inside of the production tubing 10t instead of removing the production tubing string and redeploying the production tubing string with a permanently mounted artificial lift system reduces capital commitment to the well. Deployment and removal of the ALS 1 to/from the wellsite may be accomplished in a matter of hours, thereby allowing multiple wells to be dewatered in a single day. Transmitting a DC power signal through the cable 80 reduces the required diameter of the cable, thereby allowing a longer length of the cable 80 (i.e., five thousand to eight thousand feet) to be spooled onto a drum, and easing deployment of the cable 80.

While the foregoing is directed to embodiments of the present disclosure, other and further embodiments of the disclosure may be devised without departing from the basic scope thereof, and the scope of the invention is determined by the claims that follow.

The invention claimed is:

1. A pump comprising one or more stages, each of the one or more stages comprising:
   a tubular housing;
   a mandrel disposed in the housing and comprising:
      a rotor rotatable relative to the housing and having:
         an impeller;
         a shaft, and
         one or more helicoidal blades on an outer surface of the impeller;
      a diffuser:
         connected to the housing,
         having the rotor shaft extending therethrough,
         having a plurality of vanes on an outer surface thereof, each vane having:
            an arcuate portion, and
            a longitudinal portion, and
         having a channel formed between an adjacent pair of vanes, the channel having a corresponding arcuate portion and a corresponding longitudinal portion, the corresponding longitudinal portion having a width less than one-fifth of the length of the corresponding longitudinal portion, thus minimizing the pressure gradient between a suction side and a discharge side of the channel; and
   a fluid passage formed between the housing and the mandrel.

2. The pump of claim 1 wherein each vane further has a width increasing along the arcuate portion toward the longitudinal portion.

3. The pump of claim 1, wherein:
   the diffuser has a cylindrical portion, the plurality of vanes being formed on an outer surface of the cylindrical portion.

4. The pump of claim 3, wherein:
   the cylindrical portion has a vaneless portion adjacent to an end of the longitudinal portion, and
   each vane has curved edges at the end.

5. The pump of claim 1, wherein:
   the fluid passage has a convergent nozzle section, a throat section, and a divergent nozzle section, the one or more helicoidal blades being located in the convergent nozzle section, and the plurality of vanes being located in the throat section.

6. The pump of claim 1, wherein:

the one or more stages comprises a first stage and a second stage, the second stage having only a convergent nozzle section and a throat section.

7. The pump of claim 1, wherein the channel comprises a longitudinal portion having a constant area.

8. The pump of claim 7, wherein the channel comprises an arcuate portion having a nearly constant area.

9. The pump of claim 7, wherein a width of the longitudinal channel portion is substantially less than a length of longitudinal vane portion.

10. The pump of claim 9, wherein the width of the longitudinal channel portion is between one-fifth to one-seventh a length of the longitudinal vane portion.

11. The pump of claim 1, wherein a curvature of the vanes of the plurality of vanes is opposite to a curvature of the one or more helicoidal blades.

12. A pumping system, comprising:

a submersible multi-section electric motor operable to rotate a drive shaft, wherein each section is incrementally oriented so that the sections are operable to mimic a multi-phased motor; and a pump comprising one or more stages, each of the one or more stages comprising:

a tubular housing;

a mandrel disposed in the housing and comprising:

a rotor rotatable relative to the housing and having:

an impeller;

a shaft, and one or more helicoidal blades on an outer surface of the impeller;

a diffuser:

connected to the housing, having the rotor shaft extending therethrough, having a plurality of vanes on an outer surface thereof, each vane having:

an arcuate portion, and a longitudinal portion, and having a channel formed between an adjacent pair of vanes, the channel having a corresponding arcuate portion and a corresponding longitudinal portion, the corresponding longitudinal portion having a width less than one-fifth of the length of the corresponding longitudinal portion, thus minimizing the pressure gradient between a suction side and a discharge side of the channel; and a fluid passage formed between the housing and the mandrel wherein the rotor is torsionally connected to the drive shaft.

13. The pumping system of claim 12, wherein a maximum outer diameter of the motor and pump is less than or equal to two inches.

14. The pumping system of claim 12, further comprising a submersible power conversion module (PCM) operable to:

receive a direct current power signal, and sequentially operate each section of the motor.

15. The downhole system of claim 14, further comprising a cable having two or less conductors and a strength sufficient to support the motor, the pump, and the PCM, and in electrical communication with the PCM.

16. The pumping system of claim 15, further comprising:

a sensor; and a modem operable to send a measurement from the sensor along the cable.

17. The pumping system of claim 12, wherein the motor is a switched reluctance or brushless direct current motor.

18. The pumping system of claim 12, wherein the motor and the pump are operable at greater than or equal to ten thousand RPM.

19. The pumping system of claim 12, wherein each section comprises:

a submersible tubular housing;

a stator core disposed within the housing and having one or more lobes, each lobe having a winding wrapped therearound; and a rotor disposed within the housing and comprising a rotor core, the rotor core having two or more lobes.

20. A method of dewatering a gas reservoir, comprising:

providing a pumping system having a pump powered by a motor, the pump comprising one or more stages, each of the one or more stages comprising:

a tubular housing;

a mandrel disposed in the housing and comprising:

a rotor rotatable relative to the housing and having:

an impeller;

a shaft, and one or more helicoidal blades on an outer surface of the impeller;

a diffuser:

connected to the housing, having the rotor shaft extending therethrough, having a plurality of vanes on an outer surface thereof, each vane having:

an arcuate portion, and a longitudinal portion, and having a channel formed between an adjacent pair of vanes, the channel having a corresponding arcuate portion and a corresponding longitudinal portion, the corresponding longitudinal portion having a width less than one-fifth of the length of the corresponding longitudinal portion, thus minimizing the pressure gradient between a suction side and a discharge side of the channel; and a fluid passage formed between the housing and the mandrel;

deploying the pumping system into a wellbore to a location proximate the reservoir using a cable; and supplying a power signal from surface to the motor via the cable and sequentially operating each section of the motor, thereby driving the pump and lowering a water level in the wellbore to a level proximate the reservoir by pumping a multiphase mixture of the water and a reservoir gas.

\* \* \* \* \*